(12) United States Patent
Waslowski et al.

(10) Patent No.: US 7,012,539 B2
(45) Date of Patent: Mar. 14, 2006

(54) MONITORING METHOD AND AN OPTOELECTRONIC SENSOR

(75) Inventors: Kai Waslowski, Emmendingen (DE); Gerhard Merettig, Sexau (DE); Siegfried Ringwald, Elzach (DE)

(73) Assignee: Sick AG, Waldkirch/Breisgau (DE)

( * ) Notice: Subject to any disclaimer, the term of this patent is extended or adjusted under 35 U.S.C. 154(b) by 415 days.

(21) Appl. No.: 10/211,957

(22) Filed: Aug. 2, 2002

(65) Prior Publication Data

US 2003/0059087 A1 Mar. 27, 2003

(30) Foreign Application Priority Data

Aug. 7, 2001 (DE) ......................................... 101 38 609

(51) Int. Cl.
*G08B 21/00* (2006.01)

(52) U.S. Cl. .................... 340/657; 250/559.4; 250/221; 250/222.1; 356/3

(58) Field of Classification Search ................. 340/657, 340/686.1, 545.3; 250/559.38, 559.29, 559.4, 250/221, 222.1; 356/3.03, 3.06, 3
See application file for complete search history.

(56) References Cited

U.S. PATENT DOCUMENTS

| | | | | |
|---|---|---|---|---|
| 5,225,689 A | * | 7/1993 | Buckle et al. | 250/559.4 |
| 5,787,199 A | * | 7/1998 | Lee | 382/203 |
| 5,856,667 A | * | 1/1999 | Spirig et al. | 250/208.1 |
| 5,986,255 A | * | 11/1999 | Guillot et al. | 250/214 R |
| 2001/0019112 A1 | * | 9/2001 | Muller | 250/559.31 |

FOREIGN PATENT DOCUMENTS

| | | |
|---|---|---|
| DE | 4040225 C2 | 6/1992 |
| DE | 4311691 C2 | 10/1994 |
| DE | 19721105 A1 | 11/1998 |
| DE | 19808215 C2 | 9/1999 |
| DE | 19907547 A1 | 9/1999 |
| DE | 19852173 A1 | 5/2000 |
| DE | 19951557 A1 | 5/2000 |
| DE | 10061649 A1 | 8/2001 |

* cited by examiner

*Primary Examiner*—Anh V. La
(74) *Attorney, Agent, or Firm*—Townsend and Townsend and Crew LLP

(57) ABSTRACT

An optoelectronic sensor and a method for producing a positive or a negative object detection signal in dependence on the presence or non-presence of an object in a foreground region or in a background region of a region monitored by the sensor. Transmitted light is transmitted in the direction of the monitored region during an operating phase. A plurality of received signals are produced in dependence on the reflected and the received transmitted light which are associated with the foreground region or with the background region. A difference of the received signals is compared with a differential threshold to produce the positive or the negative object detection signal, wherein a switching hysteresis is formed for a change between the positive and the negative object detection signal. The association of the received signals with the foreground region and the background region is changed in dependence on a change in the object detection signal to form the switching hysteresis.

25 Claims, 6 Drawing Sheets

MONITORING METHOD AND AN OPTOELECTRONIC SENSOR

BACKGROUND OF THE INVENTION

The invention relates to a method of producing a positive or a negative object detection signal in dependence on the presence or non-presence of an object in a foreground region or a background region of a monitored region of an optoelectronic sensor, wherein during an operating phase transmitted light is transmitted in the direction of the monitored region, a plurality of received signals are produced in dependence on the reflected and on the received transmitted light, the received signals being associated with the foreground region or the background region, and a difference of the received signals is compared with a differential threshold to produce the positive or negative object detection signal, with a switching hysteresis being formed for a change between the positive and the negative object detection signal. The invention further relates to a corresponding optoelectronic sensor.

A detection should be made by such a method or by means of a corresponding sensor as to whether and when an object enters or leaves a specific part region of the monitored region, whereas objects in other spatial regions should be ignored. If, for example in the case of so-called background masking, an object changes from the foreground region into the background region, a switch from a positive to a negative object detection signal should be made.

In this connection, work is normally carried out according to the triangulation principle: a change in the distance of a reflecting object results in a displacement of the corresponding light spot on the receiver of the sensor, for example a differential photodiode. This displacement effects a corresponding change of the received signals. If the difference of the received signals hereby exceeds or falls below a differential threshold, a switch is made from a positive to a negative object detection signal, or vice versa. The differential threshold thus corresponds to a switch gap—with respect to the monitored region.

A switching hysteresis is provided to avoid an unwanted multiple switching between the positive object detection signal and the negative object detection signal with objects which are disposed or move in the switch gap. This is usually realized in that two different thresholds are used for the difference comparison, with the differential threshold used as the basis for the further difference comparison also being changed after a change in the object detection signal. This has the effect that the differential signal must now carry out a sufficiently large change in the opposite direction to again be able to cause a change in the object detection signal. The switching hysteresis therefore corresponds to a path hysteresis inside the monitored region.

The following problem can result here for some applications: to ensure an unambiguous detection of objects with irregular, reflecting surfaces, the switching hysteresis can admittedly be enlarged. However, since objects with different reflectance result in different differential signals for the respectively same scanning distance, the resulting path hysteresis is dependent on the reflectance of the object in question. Due to the differently steep profile of the differential signal, this results in dark objects having a larger path hysteresis than brighter objects; however, this is often unwanted.

SUMMARY OF THE INVENTION

It is thus an object of the invention to improve the detection behavior for objects with different reflectance.

This object is satisfied for a method of the kind initially named in that the association of the received signals with the foreground region and the background region is changed in dependence on a change in the object detection signal to form the switching hysteresis.

In the invention, a plurality of reception elements are therefore provided which each deliver a received signal and which are at least divided into the foreground region and the background region. This division is constantly changed during the operating phase of the sensor, and indeed in dependence on a previous change in the object detection signal, in particular directly following such a change.

This change in the association of the received signals, which takes place regularly with a switching over of the object detection signal, corresponds to a displacement of the virtual separating web along the receiver of the sensor or—relative to the monitored region—to a displacement of the switching distance. In other words, the virtual geometrical position of the channel separation between the near range reception element(s) and the far range reception element(s) is displaced. The desired path hysteresis is therefore realized in this manner without necessarily having to work with a plurality of different differential thresholds.

The invention has the advantage with respect to a fixed association of the received signals with the foreground region or the background region, such as is the case with the fixed separating web of a differential diode, that at least the amount of the path hysteresis is independent of the reflectance of the reflecting object. In comparison with the known mechanical adjustment of the position of the separating web of a differential diode relative to the light spot by means of a displaceable or pivotal optical reception system, the invention has the advantage of a purely electronic solution: the changeable association in accordance with the invention can be realized with low effort. The division of the reception elements can be set to be very fine and very precise. An accidental adjustment of the association is practically precluded.

The differential signal, which is ultimately used as the basis for the comparison with the threshold in the invention, has a steeper signal profile with respect to the use of a PSD (position sensitive device) receiver in which the received signals are normed by sum division. This has the advantage that, with comparatively dark objects, the noise of the received signals or of the differential signal cannot result in incorrect switching as can be the case with the normed differential signal of a PSD receiver.

The invention thus also represents an advantageous improvement of those multi-element sensors with foreground/background masking with which a division of the reception elements is set once during a calibration phase, that is, for essentially the whole subsequent operating phase, using a reference object in the monitored region. With such sensors, the explained selection of one of a plurality of different thresholds is used to realize a switching hysteresis so that the advantage in accordance with the invention of an amount of path hysteresis independent of the reflectance of the objects is not achieved here either.

It must still be mentioned by way of explanation with respect to the invention that the change in the association of the received signals can already consist of the association of only a single received signal being changed, and that also only in part. A received signal or a reception element can namely be associated—in accordance with the energetic center of the received transmitted light—partly with the foreground region and partly with the background region.

This applies in particular to that received signal which corresponds to the border between the foreground region and the background region (received border signal).

The invention naturally also relates to a change both from a positive to a negative object detection signal and in the reverse direction.

It must furthermore be noted for purposes of clarification that the infrared spectrum or the ultraviolet spectrum are also suitable for the transmitted light and for the received light and that the reflection of the transmitted light in particular includes diffuse reflection.

It is preferred with respect to the formation of the differential signal from the received signals for the received signals to be multiplied and for these products to be added together. In this case, the change in the association of the received signals with the foreground region or the background region can take place by a simple change in the respective weighting factors.

The weighting factors are preferably selected after the change from a negative to a positive object detection signal such that the weighted sum of the received signals corresponds to the value of the differential threshold for precisely that switching distance for which an object should in turn effect a change to a negative object detection signal (switch-off distance). The same applies correspondingly to the selection of the weighting factors after a change from a positive to a negative object detection signal, at which change the switch-on distance is preferably taken into account. With such a procedure, the same differential threshold for the differential comparison can be used for both switching directions to nevertheless realize the desired path hysteresis. This is, however, not obligatory, as will be explained below.

It is of advantage for the switch-on distance, that is, the distance at which an object within the monitored region effects the production of a positive object detection signal, or for the switch-off distance to be adjustable. For example, a manual adjustment or an automatic learning is possible using a reference object introduced into the monitored region.

If the desired path hysteresis is pre-set, or likewise adjustable, it is sufficient if only either the switch-on distance or the switch-off distance is set, since the switching distance in question forms the starting point for the change of the association of the received signals in accordance with the invention to realize the switching hysteresis or the path hysteresis. As an alternative to this, provision can be made for both the switch-on distance and the switch-off distance to be set such that the sensor itself determines the resulting desired path hysteresis from this.

The change in the association of the received signals with the foreground region and the background region in accordance with the invention takes place by a defined change number of received signals or reception elements which corresponds to the switching hysteresis and which does not necessarily have to be a whole number.

While the change in the division or in the association of the reception elements and the corresponding received signals with the foreground region or the background region is—as explained—constantly changed during the operating phase, the change number, that is, the extent of this change, can be fixed manually for the length of the whole subsequent operating phase before the operating phase or automatically by a learning procedure. A manual adjustment is possible, for example, by means of a potentiometer. An adjustment or readjustment during the operating phase of the sensor is also possible.

In particular, a constant automatic matching of the change number can be provided during the operating phase. It can, for example, be advantageous to use the reflectance of the object actually disposed in the monitored region as the basis for this constant matching in order to set an increased switching hysteresis or path hysteresis at times for the desired avoidance of incorrect switching for objects with irregular reflecting surfaces. Such information on the reflectance of the object can be gained, for example, in a simple manner by summing the (non-weighted) received signals.

Alternatively or additionally, the change number or the extent of the switching hysteresis can be matched to the environmental light which is detected by the sensor when the transmitted light is switched off. If interference signals are detected within the environmental light, which can result, for example, from energy saving lamps or external light barriers, the switching hysteresis can be increased accordingly to suppress incorrect switching.

Provision is made in a further preferred embodiment of the invention for the differential threshold to have a value of zero or of substantially zero or close to zero. As will still be explained below, such a determination of the differential threshold has the advantage that not only the amount of the path hysteresis, but also its position within the monitored region is independent of the respective reflectance of the objects to be monitored.

However, such a determination of the differential threshold can have the disadvantage in some applications of a lower detection reliability: for example, a foreground scanner, in which the differential threshold is zero, can admittedly recognize when an already detected object moves along the direction of sight of the sensor from the foreground region into the background region (increasing scanning distance), since, with such a movement, the differential signal adopts a negative value at times and thus falls below the differential threshold. However, such a foreground scanner cannot always reliably recognize when an already detected object leaves the foreground region at the side with the same scanning distance, since in this case the differential signal becomes weaker without necessarily falling below the value of zero with sufficient distinctness.

However, this disadvantage is eliminated in a further preferred embodiment in which a sum of the received signals is compared with a sum threshold as an additional criterion for the switching from the positive to the negative object detection signal and/or for the switching in the opposite direction. The received signals are preferably not weighed by means of weighting factors for this sum formation. Such a sum comparison makes it possible also to recognize the explained side escape of an object which previously triggered a positive object detection signal. Such a side escape namely results in a drop in the sum signal beneath the suitably determined sum threshold.

With a further advantageous further development of the invention, a plurality of different differential thresholds or sum thresholds are used as the basis for the explained differential comparison and/or the explained sum comparison, with one of each of the thresholds in question being selected in dependence on the current object detection signal or on a switching of the object detection signal. Such a use of different thresholds can support the realization of the desired switching hysteresis in order, for example, to carry out a matching at times of the switching hysteresis to the reflectance of a currently detected object or to the determined environmental light.

The invention will be explained in the following by way of example with reference to the figures.

DESCRIPTION OF THE PREFERRED EMBODIMENTS

Figure 7:
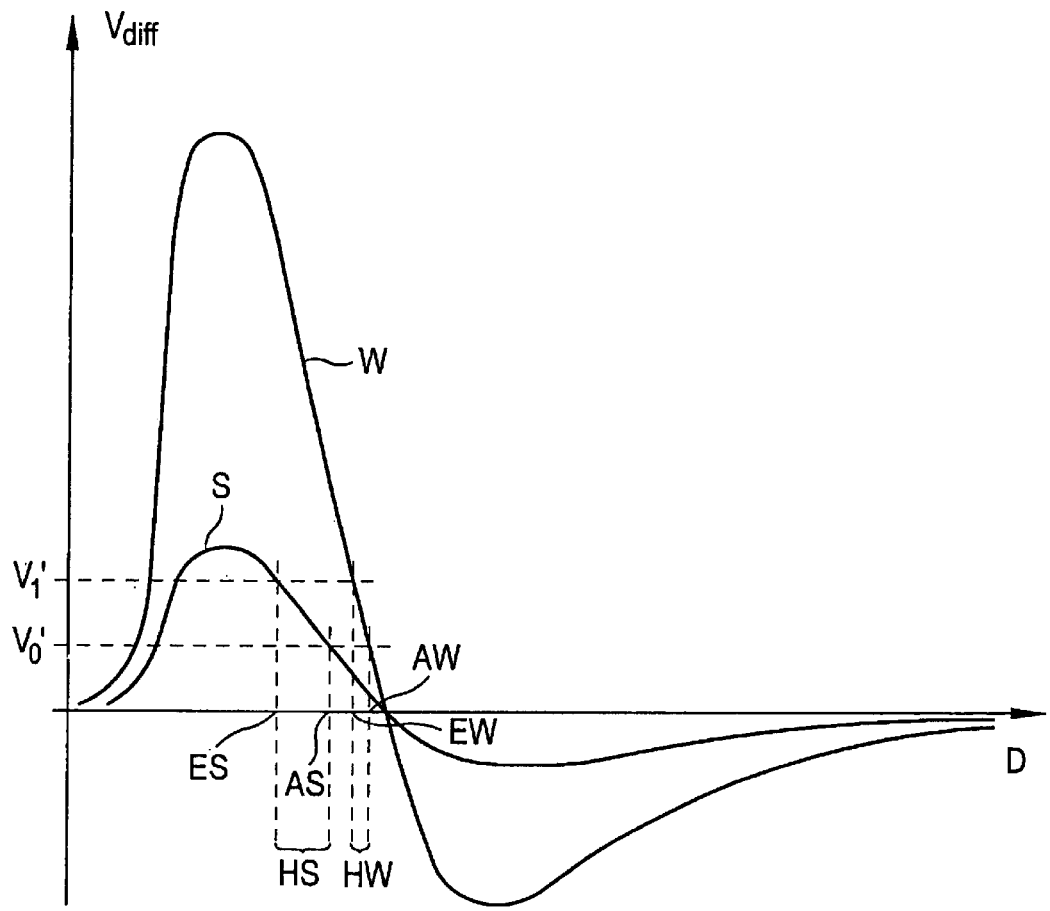
FIG. 7 shows differential signals in dependence on the scanning distance for objects of different reflectance.

FIG. 7 illustrates the problems of a different path hysteresis for objects of different reflectance. The differential signal $V_{diff}$ is entered over the scanning distance D, and indeed for a black object S and a white object W. The differential signal $V_{diff}$ has different values, and also different gradients, for different scanning distances D due to the different reflectance of the two objects W, S. The two signal profiles only intersect at the respective zero passage.

A lower and an upper differential threshold $V_0'$ or $V_1'$ are shown for the example of a foreground reflection light sensor, that is, for a background masking. If an object sufficiently approaches the sensor and if the respective differential signal $V_{diff}$ exceeds the upper differential threshold $V_1'$, a positive object detection signal is produced (switch-on distance ES or EW respectively). Only if subsequently the respective differential signal $V_{diff}$ again falls below the lower differential threshold $V_0'$, does a switch take place to a negative object detection signal (switch-off distance AS or AW respectively).

This switching hysteresis, that is, the difference between the thresholds $V_1'$ and $V_0'$, thus corresponds to a respective path hysteresis HS or HW respectively. Due to the different profile of the differential signal $V_{diff}$ for the black object and the white object S or W respectively, the corresponding path hystereses HS and HW respectively are of different length and moreover extend along different scanning distances D. This has the unwanted effect for the sensor that the switching between the negative and the positive object detection signal—and thus the recognition of the presence or non-presence of an object—takes place at different scanning distances D for the black object S and the white object W.

Figure 1A:
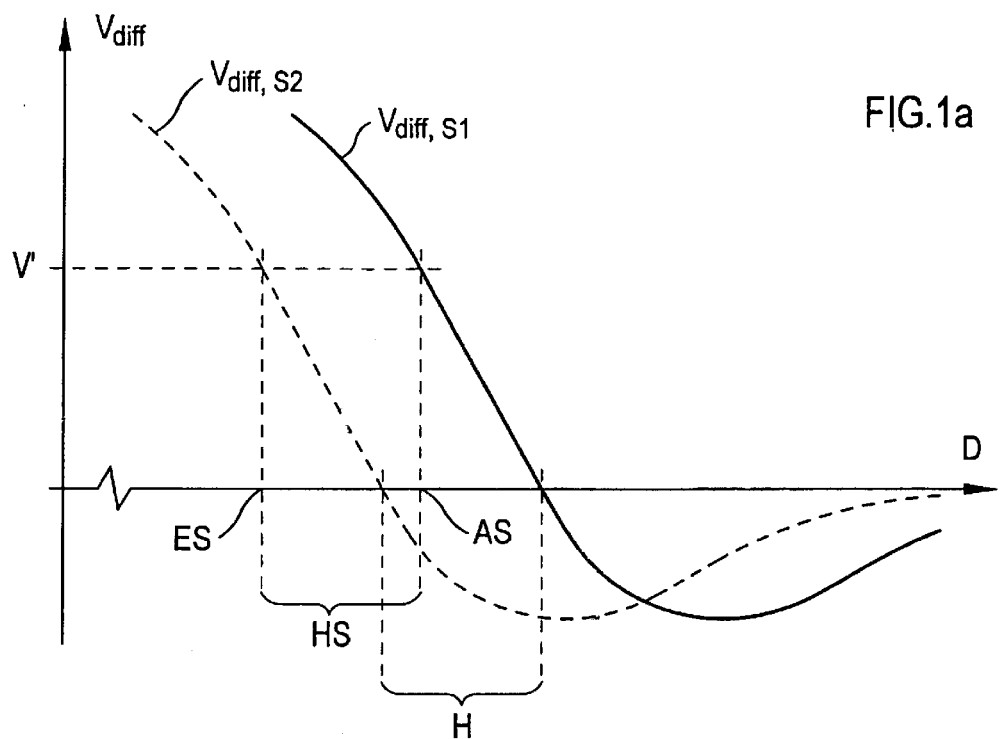
FIGS. 1 and 2 show differential signals in dependence on the scanning distance for different associations of the received signals, and indeed for an object of low reflectance (FIG. 1a, FIG. 2a) or for an object of high reflectance (FIG. 1b, FIG. 2b)
Figure 1B:
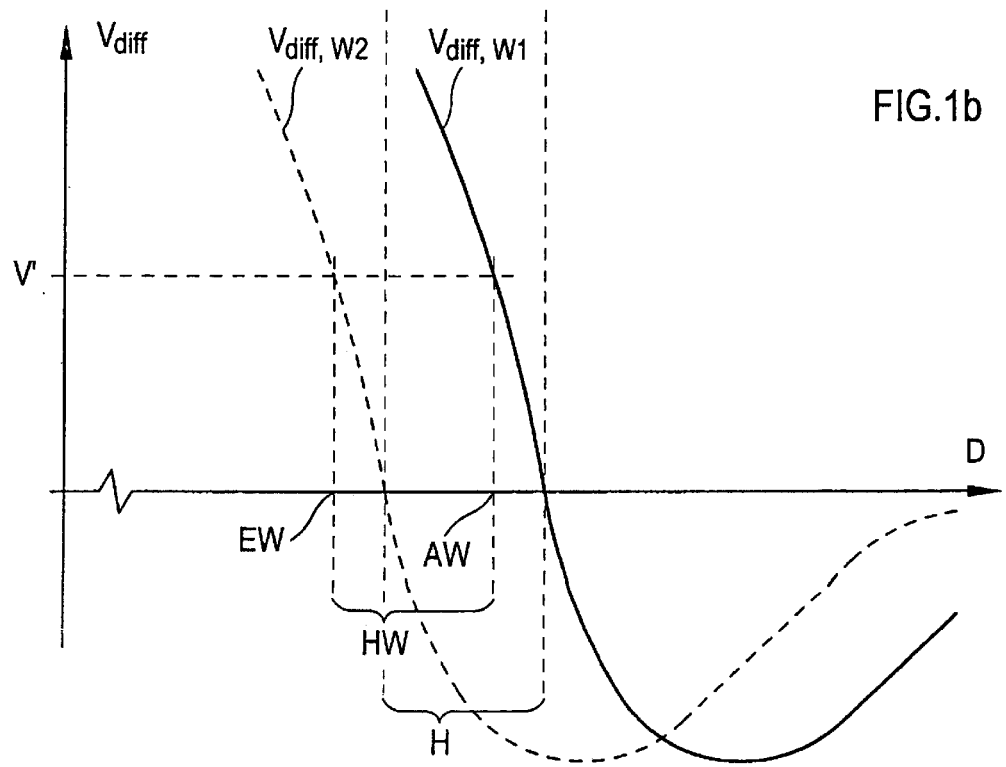

In contrast, FIGS. 1a and 1b show—in a sectional enlargement and likewise for a foreground reflection light scanner—the solution approach used as the basis for the invention, and indeed for a black and a white object respectively.

A single differential threshold V'—and indeed the same one for both objects—is provided here. If a positive object detection signal was last produced for a black object (FIG. 1a), that is, if the presence of a black object was detected at a low scanning distance D, the signal curve designated as $V_{diff, S1}$ is used as the basis for the further comparison of the difference $V_{diff}$ of the received signals of the sensor. This is achieved in that the association of the reception elements of the sensor, and thus of the corresponding received signals, with the respective foreground region or the background region is set such that the differential signal $V_{diff, S1}$ adopts the differential threshold V' precisely for the switch-off distance AS. Such a setting can be made, for example, as a calibration prior to the actual operating phase of the sensor using a black reference object.

Starting from this momentary association of the reception elements, or of the received signals, and from the corresponding profile of the differential signal $V_{diff, S1}$ for the black object (positive object detection signal), a switching to a negative object detection signal is therefore only triggered when the black object adopts a larger scanning distance D than the switch-off distance AS and the differential signal $V_{diff, S1}$ accordingly falls below the differential threshold V'.

As soon as this has been done, not only a negative object detection signal is produced, but the association of the reception elements and the received signals to the foreground region or the background region is also displaced by a specific number of changes. This has the effect that the newly determined difference in the received signals adopts a new value $V_{diff, S2}$. This is shown in FIG. 1a as a difference signal profile $V_{diff, S2}$ whose zero passage is displaced by a distance H which corresponds to the change number.

This change in association or displacement of the differential signal $V_{diff, S2}$ has the consequence that the black object must now reduce its distance from the sensor—starting from the switch-off distance AS—at least by one path hysteresis HS to again be able to trigger a switch to a positive object detection signal. Only from the switch-on distance ES, or from a lower scanning distance D, does the differential signal $V_{diff, S2}$ again exceed the differential threshold V'. An accidental too frequent switching to and fro of the object detection signal is therefore avoided in this manner.

It must be observed that the path hysteresis HS, that is, the difference between the switch-off distance AS and the switch-on distance ES, corresponds in amount to the distance H of the zero passages of the differential signal profiles $V_{diff, S1}$ and $V_{diff, S2}$.

A corresponding switching behavior also results for white objects such as can be seen from FIG. 1b. FIG. 1b shows the same section of the monitored region of the sensor, and thus the same region of the scanning distance D. Accordingly, the zero passages take place precisely for the same scanning distances D, as indicated by broken lines, for the different associations of the received signals or for the two resulting differential signal curves $V_{diff, W1}$ and $V_{diff, W2}$.

However, for the same differential threshold V', the switch-off distance AW and the switch-on distance EW are displaced—due to the higher reflectance and the thus steeper profile of the differential signal curves $V_{diff, W1}$ and $V_{diff, W2}$—in the direction of a larger scanning distance D. The path hysteresis HD for the white object is, however—corresponding to the distance H of the zero passages—just as large in amount as the path hysteresis HS for the black object.

The realization of the switching hysteresis in accordance with the invention by a change in the association of the received signals with the foreground region and the background region therefore produces the advantage that the amount of the path hysteresis HS, HW is independent of the reflectance of the object to be detected.

Figure 2A:
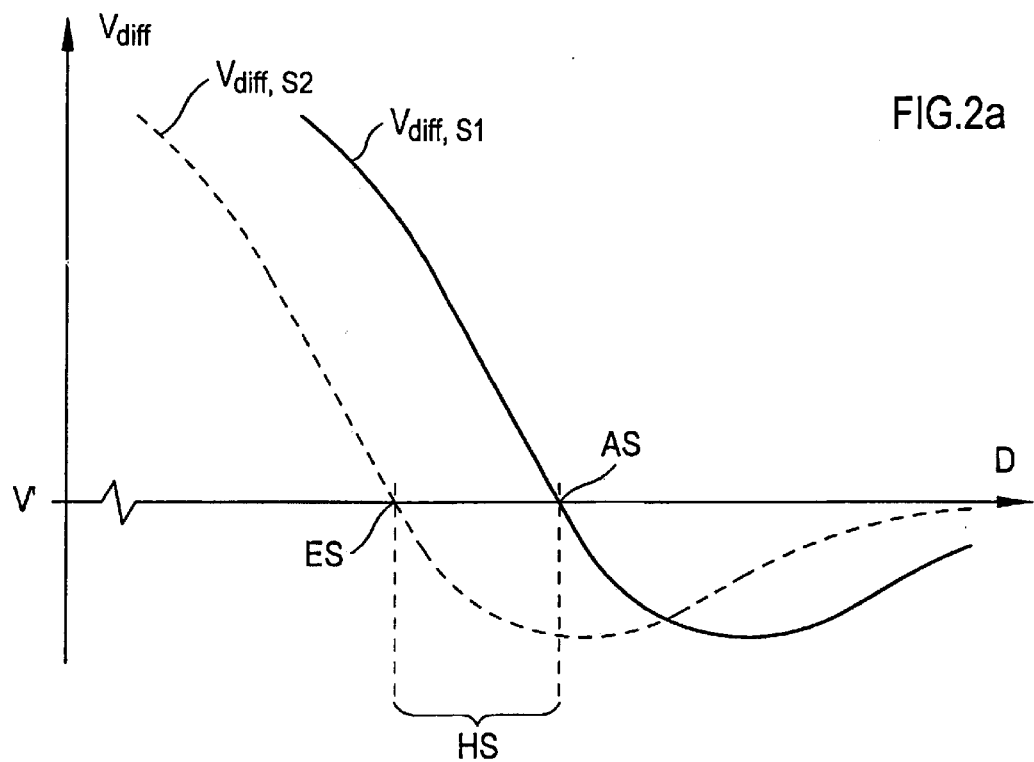
Figure 2B:
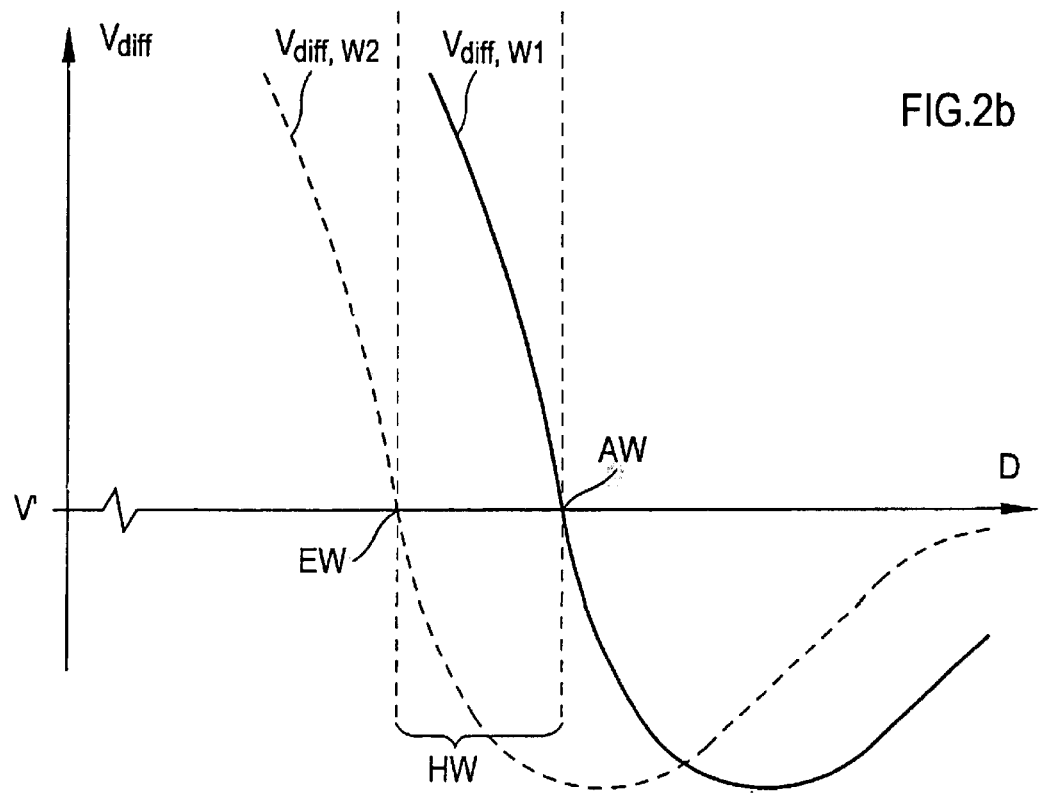

FIGS. 2a and 2b, which correspond to FIGS. 1a and 1b with respect to their designations, show an advantageous further development of the invention. Here, the differential threshold V' is fixed at the value zero. This has—for example, for a black object—the consequence that the switch-off distance AS and the switch-on distance ES correspond precisely to that scanning distance D for which the respective differential signal $V_{diff, S1}$ or $V_{diff, S2}$ adopts the value zero (cf. FIG. 2a). Since, however, the zero passages of the differential signal curves $V_{diff}$ are independent of the reflectance of the observed object, both the switch-on distances ES, EW and the switch-off distances AS, AW of a white and of a black object are the same and the same path hystereses HS, HW thus result for objects of different reflectance.

It is thus achieved by fixing the differential threshold V' at the value of zero that the path hystereses HS, HW are not only the same with respect to their amount, but also with respect to their position within the monitored region.

The selection of a differential threshold V' close to the value of zero has the advantage, in a corresponding manner, that the path hystereses HS, HW for objects of different reflectance overlap at least to a large extent.

Figure 3:
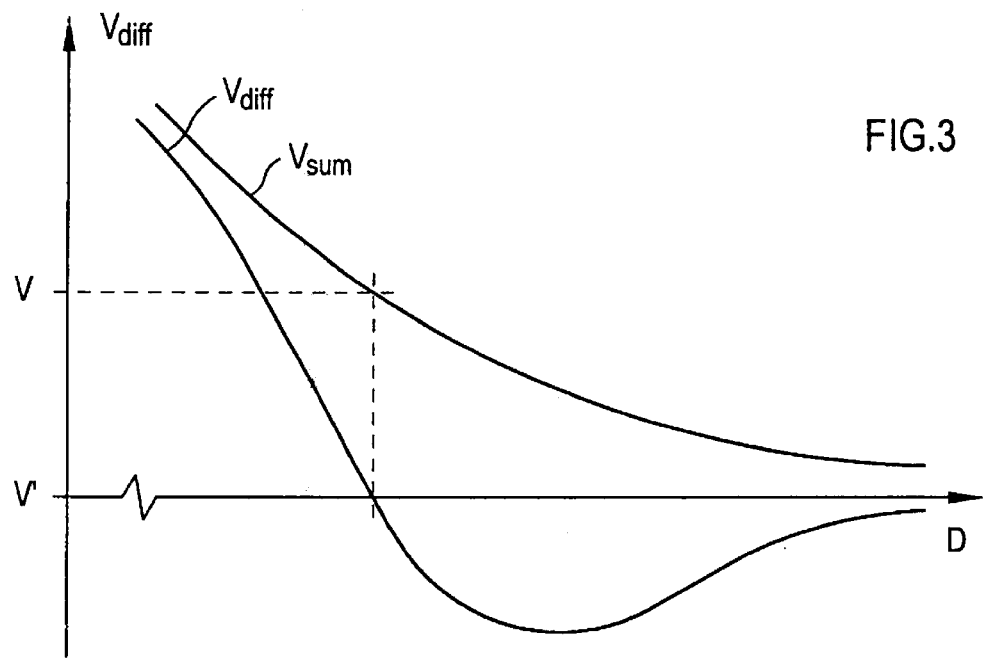
FIGS. 3 and 4 show a differential signal and a sum signal in dependence on the scanning distance for different thresholds.

In order also to be able to detect an escape of an object with a differential threshold of the value of zero, as shown in FIGS. 2a and 2b, when the object leaves the foreground region not in the direction of sight of the sensor, but to the side, a sum signal $V_{sum}$ can be taken into account in addition to the differential signal $V_{diff}$. This is shown in FIG. 3.

A check is additionally made here as to whether a sum of the received signals $V_{sum}$ falls below or exceeds a sum threshold V. For a foreground scanner, for example, a switch is made from a positive to a negative object detection signal when the differential signal $V_{diff}$ falls below the differential threshold V' (here: zero), or when the sum signal $V_{sum}$ falls below the sum threshold V. Alternatively or additionally, a comparison of the sum signal $V_{sum}$ with the sum threshold V can be used as an additional criterion for a switching from a negative to a positive object detection signal of the foreground scanner.

In the example in accordance with FIG. 3, the sum threshold value V is selected precisely such that a falling below of the sum threshold V by the sum signal $V_{sum}$ takes place for the reflectance of the object in question for the same scanning distance D as a falling below of the differential threshold V' by the differential signal $V_{diff}$.

Figure 4:
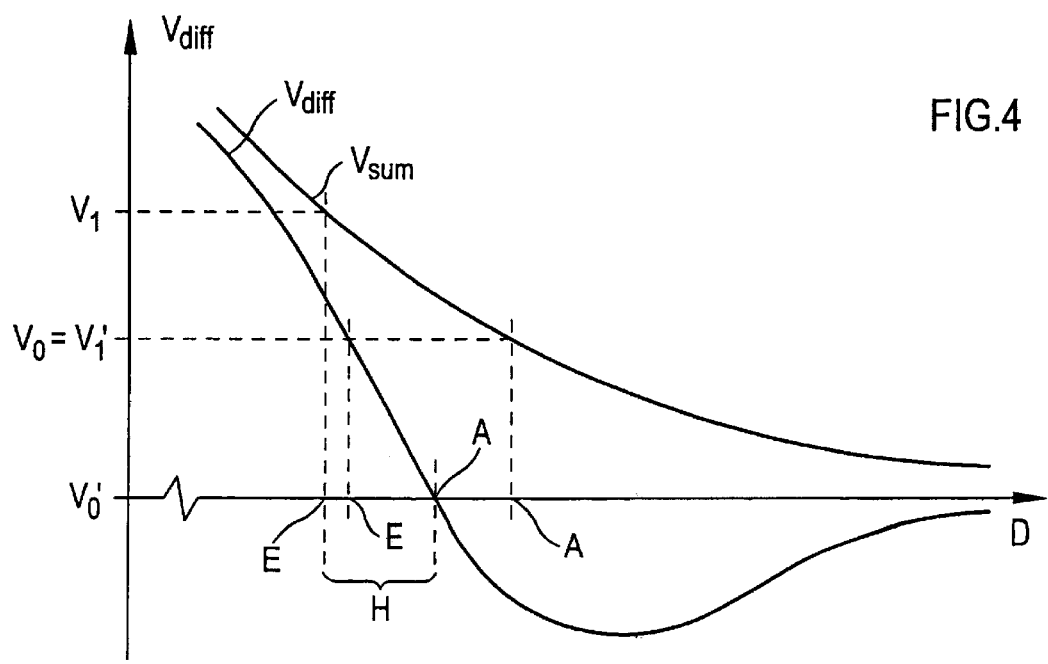

FIG. 4 shows how the realization of the switching hysteresis in accordance with the invention can be combined with a taking into account of a plurality of thresholds, with—in the example shown—a sum signal $V_{sum}$ also being formed, in addition to the differential signal $V_{diff}$, and compared with the sum thresholds.

In detail, a lower and an upper differential threshold $V_0'$ or $V_1'$ respectively and a lower and an upper threshold $V_0$ and $V_1$ respectively are shown, with the upper differential threshold $V_1'$ and the lower sum threshold $V_0$ coinciding. Depending on the taking into account of the differential signal $V_{diff}$ or of the sum signal $V_{sum}$ and of one of the possible thresholds, different switch-off distances A or switch-on distances E result. The path hysteresis entered in FIG. 4 results if—for a foreground scanner—the following switching conditions are used as the basis:

A negative object detection signal is produced when the differential signal $V_{diff}$ is lower than the lower differential threshold $V_0'$, or when the sum signal $V_0$ is lower than the lower sum threshold $V_0$.

A switch is only made to a positive object detection signal again when the differential signal $V_{diff}$ is larger than the upper differential threshold $V_1'$ and when the sum signal is larger than the upper sum threshold $V_1$.

Figure 5:
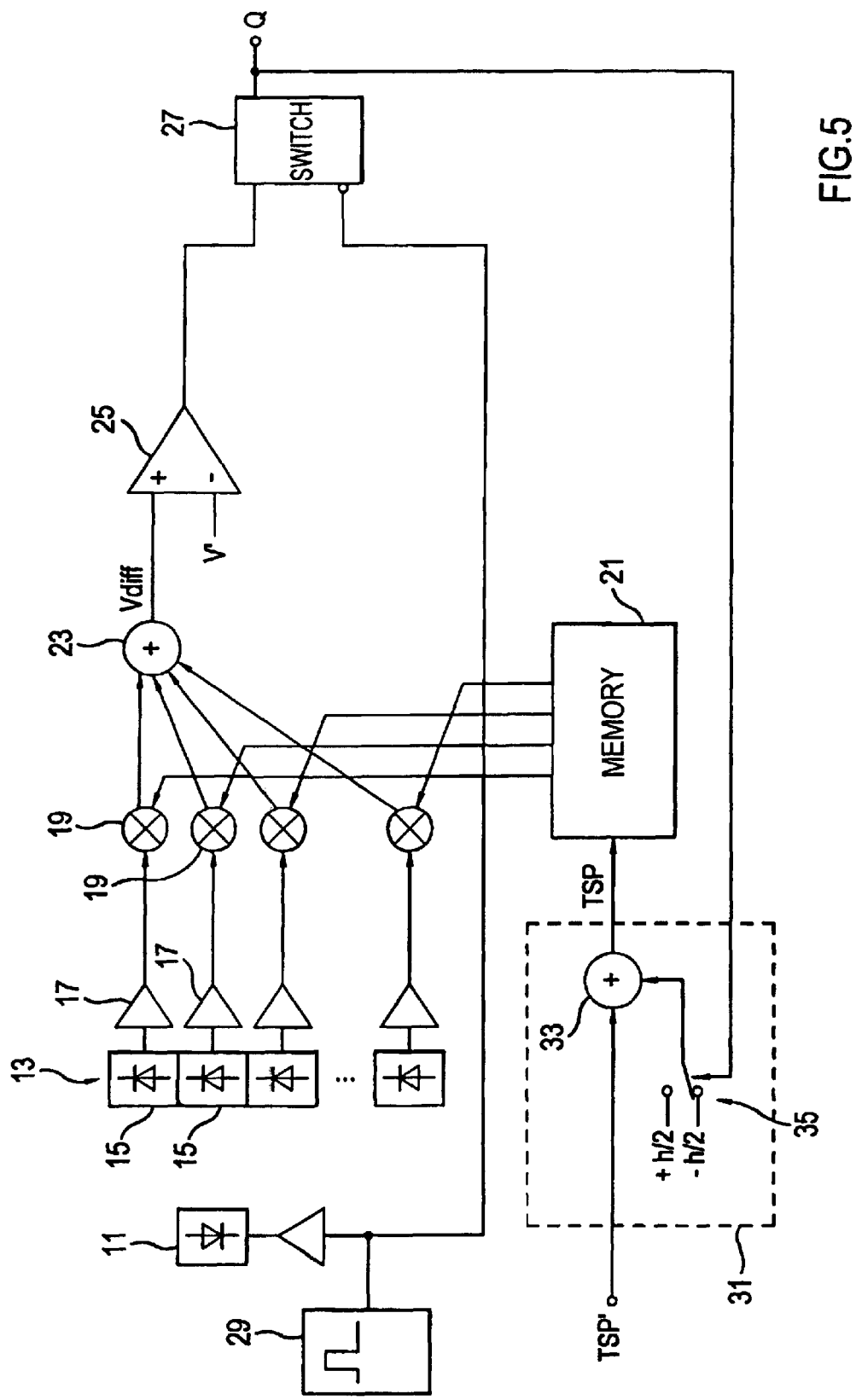
FIGS. 5 and 6 are block diagrams for different thresholds.

FIG. 5 schematically shows a possible design of the sensor in accordance with the invention.

This sensor has a transmitter 11 and a receiver 13, which forms a triangulation arrangement with the transmitter 11 and has a number m of reception elements 15. For example, the receiver 13 can be a photodiode cell having 16, 32, 64, 128 or 256 diodes.

The received signals of the reception elements 15 are passed on to a respective analog multiplier 19 via a respective amplifier 17. There, the received signal in question is multiplied by a respective weighting factor $F_1$ which is taken from a weighting table which is stored in a memory 21.

The received signals weighted in this way are delivered to a summer 23 which—due to a corresponding fixing of the weighting factors $F_1$—ultimately produces a differential signal $V_{diff}$ of the received signals and forwards this to the positive input of a comparator 25. A differential threshold V' is applied to the negative input of the comparator 25.

The outlet signal of the comparator 25 is applied to the switch input of a flip-flop 27 which produces an object detection signal Q at its switch outlet.

A clock 29 feeds the transmitter 11 and the flip-flop 27 with a rectangular pulse.

The memory 21 is controlled by means of a control device 31 in that this passes on a current separation web position signal TSP. The control device 31 has a summer 33 at whose one input a base separating web position signal TSP' is applied and whose other input is connected via a switch 35 optionally to a positive half change number +h/2 or to a negative half change number −h/2. The switch 35 is again controlled by the object detection signal Q applied to the outlet of the flip-flop.

The sensor shown in FIG. 5 can carry out the monitoring method explained with reference to FIG. 1 or the monitoring method explained with reference to FIG. 2 in the following manner:

The clock 29 causes the transmitter 11 to emit pulsed transmitted light signals. The light reflected by an object disposed in the monitored region of the sensor results on the part of the receiver in the production of the received signals which are converted—in dependence on the weighting and the addition—into the differential signal $V_{diff}$.

The differential signal $V_{diff}$ calculated in this way is compared with the differential threshold V'. If, as a consequence of a movement of an object within the monitored region, the differential signal $V_{diff}$ exceeds or falls below the differential signal $V_{diff}$ and if the output signal of the comparator 25 changes as a result, the flip-flop 27 switches in the next cycle of the clock 29 from a positive to a negative object detection signal Q or vice versa. This switching of the object detection signal Q also effects a switching of the switch 35 such that now a positive half change number +h/2 is added to the basis separating web position signal TSP' instead of a negative half change number −h/2, or vice versa. This results in the following manner, for example, in a change in the weighting factors $F_i$:

The weighting factors $F_i$ can be calculated as shown in the following table.

| $TSP_c$ | $F_1$ | $F_2$ | $F_3$ | ... | $F_{m-1}$ | $F_m$ |
|---|---|---|---|---|---|---|
| 0 | −1 | $F_f$ | +1 | ... | +1 | +1 |
| 1 | −1 | −1 | $F_f$ | ... | +1 | +1 |
| 2 | −1 | −1 | −1 | ... | +1 | +1 |
| ... | | | | | | |
| m-4 | −1 | −1 | −1 | ... | +1 | +1 |
| m-3 | −1 | −1 | −1 | ... | $F_f$ | +1 |

The receiver 13 has, as already mentioned, m reception elements 15. The table stored in the memory 31 has m−2 lines, with each line being associated with one of the central reception elements 15 of the receiver 13. The lines $TSP_c$ of the table are numbered from $TSP_c=0$ to m−3.

The table prescribes a weighting factor of $F_i=+1$ for the received signals associated with the foreground region and a weighting factor of F'i'=−1 for the received signals associated with the background region (or vice versa).

Only the received signal of that central reception element 15, which is intended to correspond to the border between the foreground region and the background region, is multiplied by a weighting factor $F_f$ which can adopt k discrete values between $-1 \leq F_f < 1$. The parameter k is freely selectable and sets the resolution at which the central reception element 15 should be divided. For example, the resolution parameter k can have the value 256.

The corresponding weighting factor $F_f$ is equal to:

$$F_f = \frac{TSP_f - \frac{k}{2}}{\frac{k}{2}}$$

Here, the norming value $TSP_f$ can adopt a value between 0 and k−1 on the basis, for example, of a learning procedure or of a manual potentiometer setting.

The separating web position signal TSP results as:

TSP=$TSP_c$*k+$TSP_f$

The separating web position signal TSP can adopt discrete values between 0 and (m−2)*k−1.

The separating web position signal TSP defines the position of the virtual separating web on the receiver 13 and corresponds to a defined scanning width of the object to be detected, that is, the position of the light spot on the receiver 13, at which the differential signal $V_{diff}$ just becomes zero. The relationship between the separating web position signal TSP and the scanning width is admittedly not linear, but it is monotone.

The current separating web position signal TSP is produced, as already explained, from the basic separating web position signal TSP' and the addition or subtraction of a half change number h/2. The basic separating web position signal TSP' can be adjustable—prior to the addition or subtraction of the half change number h/2 or thereafter, as the current separating web position signal TSP—manually by a potentiometer or can be determined, before the operating phase, by a learning procedure using a reference object. The change number h corresponds—relative to the monitored region—to the path hysteresis H and it can likewise be changeable before or during the operating phase.

The position of the energetic center of the received light spot on the receiver 13 is defined by the defining of the separating web position signal TSP, and by the defining of the weighting factors $F_i$ connected to it. With a learning or norming of the sensor to a defined scanning width or to a certain switch distance, the separating web position signal TSP can be set by a locked loop such that the differential signal $V_{diff}$ just becomes zero.

It must still be noted that the table described only represents a mental aid. In the technical realization, the m multipliers 19 and the table 21 can be replaced, for example, by a switch matrix and an R2R network.

Figure 6:
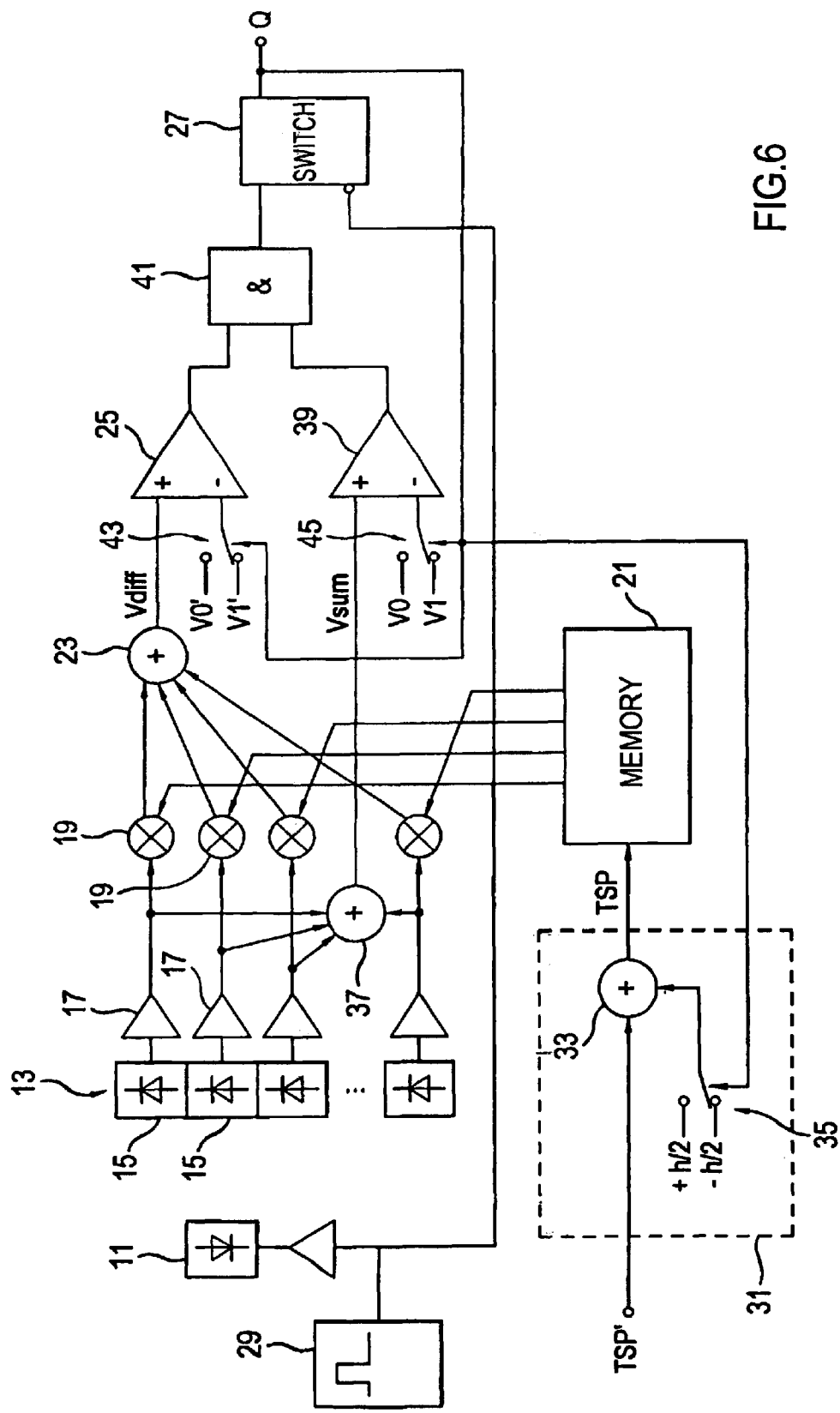

FIG. 6 shows a further development of the sensor in accordance with FIG. 5 which is suitable for the carrying out of the monitoring process explained with reference to FIGS. 3 and 4. The same elements as in FIG. 5 are characterized with the same reference numerals. However, the following main differences exist:

On the one hand, a further summer 37 is provided by which—in accordance with the process of FIG. 3—the received signals are added on without further weighting and are forwarded to a further comparator 39 as a sum signal $V_{sum}$. A sum threshold comparison is carried out within the comparator 39, with the comparison result being forwarded as the output signal, together with the output signal of the comparator 25, to an AND gate 41. The output signal of the AND gate 41 is applied at the switch input of the flip-flops 27. This switching has the effect that the flip-flop 27 only switches to a positive object detection signal, for example, when both the differential signal $V_{diff}$ exceeds a differential threshold and the sum signal $V_{sum}$ exceeds a sum threshold, while a negative object detection signal Q is only triggered when either the differential signal $V_{diff}$ falls below a differential threshold or the sum signal $V_{sum}$ falls below a sum threshold.

On the other hand, the sensor in accordance with FIG. 6 differs from the sensor shown in FIG. 5 in that there are available for the negative input of the comparator 25 a lower and an upper differential threshold $V_0'$ or $V_1'$, of which one each can be selected by means of a switch 43. The negative input of the further comparator 31 is also optionally connectable to a lower or an upper sum threshold $V_0$ or $V_1$ in that a switch 45 is correspondingly controlled. The two switches 43, 45 are controlled via the object detection signal Q output by the flip-flop 27 such that a switch between the thresholds $V_0'$ and $V_1'$ and $V_0$ and $V_1$ respectively is necessarily associated with each change in the object detection signal Q. An additional switching hysteresis is produced in this manner.

It must be noted with respect to the sensors in accordance with FIG. 5 and FIG. 6 that the control and evaluation procedures can also each be carried out by means of a common microprocessor.

What is claimed is:

1. A method of producing a positive or a negative object detection signal in dependence on the presence or non-presence of an object in a foreground region or a background region of a monitored region of an optoelectronic sensor,
    wherein, during an operating phase,
        transmitted light is transmitted in the direction of the monitored region;
        a plurality of received signals are produced in dependence on the reflected and the received transmitted light which are associated with the foreground region or the background region; and
        a difference of the received signals is compared with a differential threshold to produce the positive or the negative object detection signal;
    wherein a switching hysteresis is formed for a change between the positive and the negative object detection signal, and
    wherein the association of at least one of the received signals to the foreground region and to the background region is changed in reaction to each change between the positive object detection signal and the negative object detection signal to form the switching hysteresis.

2. A method in accordance with claim 1, wherein at least that received signal which corresponds to the border between the foreground region and the background region is associated with the foreground region in part and with the background region in part in accordance with an energetic center of the received transmitted light.

3. A method in accordance with claim 1, wherein the received signals which are associated with the foreground region are subtracted from the received signals which are associated with the background region, or vice versa, to form the difference.

4. A method in accordance with claim 1, wherein the received signals are offset with weighting factors to form the difference, with the weighted received signals being added.

5. A method in accordance with claim 4, wherein the weighting factors are selected such that the weighted sum of the received signals corresponds to the value of the differential threshold for a switching distance in which an object disposed within the monitored region effects a change in the object detection signal.

6. A method in accordance with claim 4, wherein the weighting factors which correspond to an association of the received signal in question with the foreground region and the weighting factors which correspond to an association of the received signal in question with the background region have different signs.

7. A method in accordance with claim 4, wherein the change of the association of the received signals with the foreground region and the background region takes place by a change in the respective weighting factors by changing at least the sign of the respective weighting factors.

8. A method in accordance with claim 4, wherein the weight factors of at least the received signals which are completely associated with the foreground region or with the background region are whole figures and have the value +1 or −1; and/or wherein the weighting factor of the received border signal has the value of a positive or of a negative number or of a positive or of a negative fraction which respectively corresponds to an energetic center of the received transmitted light.

9. A method in accordance with claim 1, wherein the distance at which an object effects the production of a positive object detection signal and/or the distance at which an object effects the production of a negative object detection signal is one of adjustable and learnable.

10. A method in accordance with claim 1, wherein the association of the received signals with the foreground region and the background region is at least one of changed during the operating phase of the sensor and changed such that the border between the foreground region and the background region is displaced.

11. A method in accordance with claim 1, wherein the change in the association of the received signals with the foreground region and the background region takes place by a certain change number of received signals, wherein the change number is set at least one of
before the operating phase for the period of the whole successive operating phase;
manually or by a learning procedure before the operating phase;
manually or in dependence on a sum of the received signals during the operating phase; and
in dependence on at least one of the intensity and on changes in the environmental light.

12. A method in accordance with claim 1, wherein the change in the association of the received signals with the foreground region and the background region takes place in each case starting from a switch-on distance or from a switch-off distance.

13. A method in accordance with claim 1, wherein at least three received signals are produced.

14. A method in accordance with claim 1, wherein the differential threshold is one of zero, substantially zero and close to the value zero.

15. A method in accordance with claim 1, wherein the difference of the received signals is compared with one of at least two different differential thresholds selected in dependence on the current object detection signal.

16. A method in accordance with claim 1, wherein a sum of the received signals is compared with a sum threshold to produce the positive or negative object detection signal, wherein the sum of the received signals is compared with one of at least two different sum thresholds which is selected in dependence on the current object detection signal.

17. A method in accordance with claim 16, wherein provision is made as the condition for the production of a negative or of a positive object detection signal that
either the difference of the received signals is lower than one of a differential threshold and a lower differential threshold; or
the sum of the received signals is lower than one of a sum threshold and a lower sum threshold.

18. A method in accordance with claim 16, wherein provision is made as the condition for the production of a positive or of a negative object detection signal that
the difference of the received signals is larger than one of a differential threshold and an upper differential threshold; and
the sum of the received signals is larger than one of a sum threshold and an upper sum threshold.

19. A method in accordance with claim 13, wherein the number of received signals that are produced is one of at least 16, 32, 64, 128 and 256.

20. An optoelectronic sensor comprising
a transmitter for transmitting transmitted light in the direction of a monitored region;
a receiver for outputting at least two received signals in dependence on the reflected and the received transmitted light, with the received signals being associated with a foreground region or with a background region; and
an evaluation unit by which a difference of the received signals can be compared with a differential threshold to detect whether an object or no object is disposed in the foreground region or the background region of the sensor, and a positive or a negative object detection signal can be produced in dependence on the result of this comparison;
wherein a switching hysteresis is provided for a change between the positive and the negative object detection signal; and
wherein the sensor comprises a device for changing the association of at least one of the received signals with the foreground region and the received signals with the background region in reaction to each change between the positive object detection signal and the negative object detection signal to form the switching hysteresis.

21. A sensor in accordance with claim 20, comprising at least one of the evaluation unit having at least one multiplication unit, by which the received signals can be offset by weighting factors, and a memory unit in which a table of different weighting factors can be stored which can be read by the evaluation unit.

22. A sensor in accordance with claim 20, wherein the evaluation unit has at least one of at least one summing device by which the received signals can be added to one another in a weighted and/or unweighted manner;
a comparison unit by which the received signals or a function thereof are comparable with the differential threshold; and
a comparison unit by which a sum of the received signals can be compared with a sum threshold with the result of this comparison being provided as an additional criterion for the production of the object detection signal.

23. A sensor in accordance with claim 20, wherein at least one of the association of the received signals with the foreground region and with the background region is changeable by a change number which corresponds to a whole number of reception elements of the sensor or to a fraction thereof and the evaluation device has a selection device by which at least one differential threshold or sum threshold value is selectable for a comparison of the received signals or a fraction hereof.

24. A sensor in accordance with claim 20, wherein at least one of the transmitter and the receiver form a triangulation arrangement;

the receiver has a corresponding number of reception elements in the form of a photodiode cell, to produce the received signals;

the sensor is made as a foreground sensor or as a background sensor; and a clock is provided by which the transmitter can be controlled to transmit pulsed transmitted light.

25. A sensor in accordance with claim 20, comprising a reflection light scanner.

* * * * *